(12) United States Patent
Fuller et al.

(10) Patent No.: US 7,203,186 B1
(45) Date of Patent: Apr. 10, 2007

(54) SYSTEM AND DEVICE FOR INTEGRATING IP AND ANALOG TELEPHONE SYSTEMS

(76) Inventors: William H. Fuller, 3508 Bradford Dr., Richardson, TX (US) 75082; Son T. Tran, 14815 Woodbriar Dr., Dallas, TX (US) 75248

( * ) Notice: Subject to any disclaimer, the term of this patent is extended or adjusted under 35 U.S.C. 154(b) by 1045 days.

(21) Appl. No.: 09/723,099

(22) Filed: Nov. 27, 2000

(51) Int. Cl.
*H04L 12/66* (2006.01)

(52) U.S. Cl. .................. 370/352; 370/352; 370/401; 370/419; 370/431; 379/221.02

(58) Field of Classification Search ........... 370/352, 370/353, 354, 355, 356, 235, 401, 419, 431; 379/221.02; 704/270.1; 710/72
See application file for complete search history.

(56) References Cited

U.S. PATENT DOCUMENTS

| | | | | |
|---|---|---|---|---|
| 6,119,179 A | * | 9/2000 | Whitridge et al. | 710/72 |
| 6,205,120 B1 | * | 3/2001 | Packer et al. | 370/235 |
| 6,282,192 B1 | * | 8/2001 | Murphy et al. | 370/352 |
| 6,404,764 B1 | * | 6/2002 | Jones et al. | 370/352 |
| 6,654,722 B1 | * | 11/2003 | Aldous et al. | 704/270.1 |
| 6,661,785 B1 | * | 12/2003 | Zhang et al. | 370/352 |
| 6,718,030 B1 | * | 4/2004 | Turner et al. | 379/221.02 |
| 6,760,324 B1 | * | 7/2004 | Scott et al. | 370/352 |
| 2004/0090954 A1 | * | 5/2004 | Zhang et al. | 370/352 |

* cited by examiner

*Primary Examiner*—Jean Gelin
*Assistant Examiner*—Inder Pal Mehra
(74) *Attorney, Agent, or Firm*—Wood, Herron & Evans, LLP

(57) ABSTRACT

A system and a call forwarding manager device for providing Internet telephony to a subscriber's premises via the subscriber's Internet connection, facilitated by the subscriber's analog telephone connection. Incoming analog telephone calls are received by the call forwarding manager connected to the subscriber's analog telephone line, which responds by generating a request for service from a voice gateway, which may be remotely located. The voice gateway then generates an Internet telephone connection from the voice gateway to an Internet protocol telephone owned by the subscriber, and then connects the analog telephone call via the voice gateway to the Internet protocol telephone via the subscriber's Internet connection.

33 Claims, 4 Drawing Sheets

SYSTEM AND DEVICE FOR INTEGRATING IP AND ANALOG TELEPHONE SYSTEMS

FIELD OF THE INVENTION

The present invention relates to systems for providing telephony via the Internet and via legacy POTS telephone equipment.

BACKGROUND OF THE INVENTION

The telephone has become a nearly universal appliance in modern homes and business. While other communications media such as the Internet and satellite and radio communications have advanced, the telephone remains the most popular instrument for communication today. Unfortunately, telephone technology has not been substantially enhanced since its introduction. Telephone connections continue to use analog electrical signal transmission over twisted-pair wires, between individual telephone terminals. While substantial advancements have been made in the transmission of telephone signals, including the use of sophisticated digital switching, digital compression and decompression and digital transmission, telephone terminals remain analog devices connected to standard analog POTS telephone lines. Meanwhile, other communications media, such as the Internet, radio and satellite have evolved utilizing digital technology, which substantially enhances the flexibility of those communication systems, while also improving the quality of transmission.

Recently, with the promulgation of the voice over IP protocol H.323 (VoIP), and the emergence of H.323 compatible software such as "NetMeeting", digital Internet telephony has become increasingly popular. Digital Internet telephony is accomplished by established a VoIP connection via an existing Internet connection, using the H.245 call management protocol; and then initiating an exchange of information between terminals compatible with the H.323 communication standard.

VoIP terminals typically are computer systems having Internet connections available for established H.323 communication. However, more recently, stand alone VoIP telephone sets have been developed, which are attachable to an Internet connection. Furthermore, hand sets are available for use with computer systems to facilitate the use of the computer system and its Internet connection to perform VoIP telephony. Using these devices, VoIP telephony has become increasingly popular. This popularity is in no small part due to the lack of communication surcharges on traffic passed over the Internet, as compared to the toll based charges for standard telephone service performed via local area telephone and long distance telephone carriers.

A difficulty with VoIP telephony is the need to provide standard POTS telephone connectivity to environments in which digital telephones are in use. A VoIP telephone is not readily configurable to operate as a standard analog telephone, to send and receive calls using POTS telephone standards. Although VoIP telephony is expected to become widely used as a method for telephone communication, it will be necessary for VoIP telephony to coexist with preexisting POTS telephony systems for a substantial period of time to come. Therefore, to convert completely to VoIP telephony, it is necessary to adapt VoIP telephones to operate properly utilizing standard POTS telephone service.

The most popular environment in which VoIP telephony has been used, is large corporate campuses or other substantial installations. In these environments, VoIP telephony may be used within the campus, and communications to outside VoIP or POTS telephone devices can be managed through a central point for the entire installation. VoIP/POTS interfacing and management requires the use of specialized hardware devices known as a voice gateway and call manager.

A voice gateway (also known as a media gateway) is a specialized telephone hardware device including analog to digital and digital to analog conversion systems, that convert an analog POTS telephone line to be connected to one of a number of Internet VoIP telephone sets, so that outbound calls may be originated from a VoIP telephone set and terminated via the publicly switched telephone network, and inbound calls from the publicly switched telephone network can be delivered as VoIP calls to an appropriate telephone. A voice gateway thus permits VoIP telephones to send and receive POTS analog telephone calls. Furthermore, a voice gateway may be used to permit POTS analog telephones to send and receive VoIP Internet telephone calls using the same hardware of the voice gateway. Thus, a voice gateway is installed at a corporate campus or other substantial installation, to permit use of VoIP telephones and legacy POTS telephone sets throughout the installation, with the voice gateway providing interface between the publicly switched telephone network, an Internet connection, and each of the telephones in the corporate campus.

A voice gateway is typically installed along with a call manager (also known as a call agent or media gateway controller) which is responsible for managing the activities of the voice gateway. The call manager includes routing tables identifying the manner in which incoming and outgoing POTS analog and VoIP digital telephone calls should be routed. The call manager utilizes these routing tables to instruct the voice gateway to perform appropriate actions to connect telephone calls to their desired destinations.

The use of voice over IP or VoIP telephony has been limited thus far to corporate campuses and other large installations, for the reason a voice gateway and a call manager are complex and expensive hardware devices. The expense of these devices can only be justified when the potential cost savings from the use of VoIP telephony, will exceed the expense of the voice gateway and call manager. Normally this is possible with large installations where the voice gateway and call manager can be shared by a large number of telephone systems that are under common ownership.

Recently, a number of services have been introduced for the purpose of facilitating individual or small corporate use of VoIP telephony. For example, a service known as DialPad has been established for use by users with computer systems capable of VoIP telephony. According to the DialPad system, a user having an independent Internet connection connects to the DialPad Internet site and delivers a VoIP address or standard analog POTS telephone number to the DialPad server. The DialPad server is connected to both a voice gateway and a call manager, in turn connected to the Internet backbone and to the publicly switched telephone network at one or a number of local areas. The server is capable of delivering a VoIP telephone call to a VoIP telephone recipient via Internet connections and is also able to utilize the voice gateway to translate a VoIP telephone connection from VoIP to standard POTS telephone service for delivery to a standard POTS telephone number. DialPad thus permits a individual or small business user to perform VoIP telephony and POTS telephony over a single Internet connection, however such a user may not receive telephone connections, but may only originate.

A second service, provided to cellular telephone users by Ericsson, is known as Phone Doubler. This service will deliver telephone calls received at a standard POTS telephone number to a VoIP telephone set, provided that VoIP set is currently connected through an ISP and Internet connection. Thus, this service permits inbound POTS analog telephone connections to be routed to a VoIP telephone on an individual basis. However, this service does not permit outbound telephone communication.

A third service of this kind is known as Pagoo.com. In this service, a subscriber obtains a standard POTS telephone number which is owned by Pagoo and is terminated at Pagoo's telephone server. An inbound dialing party connects to Pagoo's server and provides a three digit extension identifying a specific subscriber. This three digit extension is used to route the inbound telephone connection to either a VoIP connection at a computer or a standard analog POTS connection at a subscriber-specified telephone number. To maintain connectivity using the Pagoo system, a subscriber must log in to the server and register a telephone number or computer Internet address before telephone calls may be received. A dedicated VoIP telephone may not be used with the Pagoo system for the reason that it cannot be logged into the server. Furthermore, the Pagoo system does not support outbound telephony, but only inbound telephony using a Pagoo telephone number and a three digit extension.

It can be seen by the foregoing, that the Internet telephony options available to small business and residential users, are substantially limited. A need therefore exists for a methodology and system that permits the use of Internet telephony by residences and small business in a manner directly analogous to the current use of analog POTS telephone service, including inbound and outbound service, multiple inbound and outbound lines, and all other conveniences and features of modern POTS analog telephony.

SUMMARY OF THE INVENTION

The invention satisfies this need by providing Internet telephony to a subscriber's premises via the subscriber's Internet connection, facilitated by the subscriber's analog telephone connection. Incoming analog telephone calls are received by a call forwarding manager connected to the subscriber's analog telephone line, which responds by generating a request for service from a voice gateway, which may be remotely located. The voice gateway then generates an Internet telephone connection from the voice gateway to an Internet protocol telephone owned by the subscriber, and then connects the analog telephone call via the voice gateway to the Internet protocol telephone via the subscriber's Internet connection.

In the described embodiment, the call forwarding manager is located at the subscriber's premises, and connected to an analog telephone line at the subscriber's premises. The voice gateway is remote from the subscriber's premises. In this approach, the voice gateway may be utilized by multiple subscribers simultaneously to provide conversion between Internet telephony and analog telephony standards, thus spreading the cost of that device across multiple subscribers.

In this embodiment, the voice gateway is managed by a call manager, which receives requests for service from the call forwarding manager, and establishes Internet telephone connections from the voice gateway to the Internet protocol telephone for use by the voice gateway. The analog telephone call is connected to the voice gateway by delivery of one or more of TAPI, JTAPI, SCTP, or proprietary interface commands to a telecommunications exchange switch. In the described embodiment, the call manager performs a data driven call management application, which can include providing enhanced services to the subscriber including establishing pick groups, hunt groups, call forwarding and voice messaging for the Internet protocol telephones of the subscriber.

To facilitate such advanced functions, in this embodiment the call forwarding manager receives dialed number information service (DNIS) data regarding an analog telephone call and forwards the DNIS data as part of requesting gateway service. The DNIS data may be used, for example, in identifying an Internet protocol telephone as a recipient of an analog telephone call. The call forwarding manager may also receive automatic number identification (ANI) data regarding an analog telephone call and forward it as part of a request for service. The ANI data can also be used in identifying an Internet protocol telephone as a recipient of the analog telephone call. DNIS and ANI data may also be used in voice response systems implemented by the call manager.

Aspects of the invention include the above-described method and apparatus for performing analog/IP telephony, as well as the call forwarding manager per se. The call forwarding manager comprises an analog telephone connection for connection to an analog telephone line to capture one or more of dialed number information service data or automatic number identification data, and a digital communications connection for delivering a request for service including one or more of the dialed number information service data or automatic number identification data.

The digital communications interface of the call forwarding manager may be a serial connection such as USB, Firewire or Ethernet, or may be a parallel connection such as IEEE-488, or PCI, ISA (in the latter two cases, the call forwarding manager may be in the form of a PC card).

The call forwarding manager may also incorporate advanced functionality such as firewall and VPN systems for managing communications via a digital connection, an ADSL, cable, or wireless modem, and/or quality of service and RSVP service systems for managing communications via the digital communications connection.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
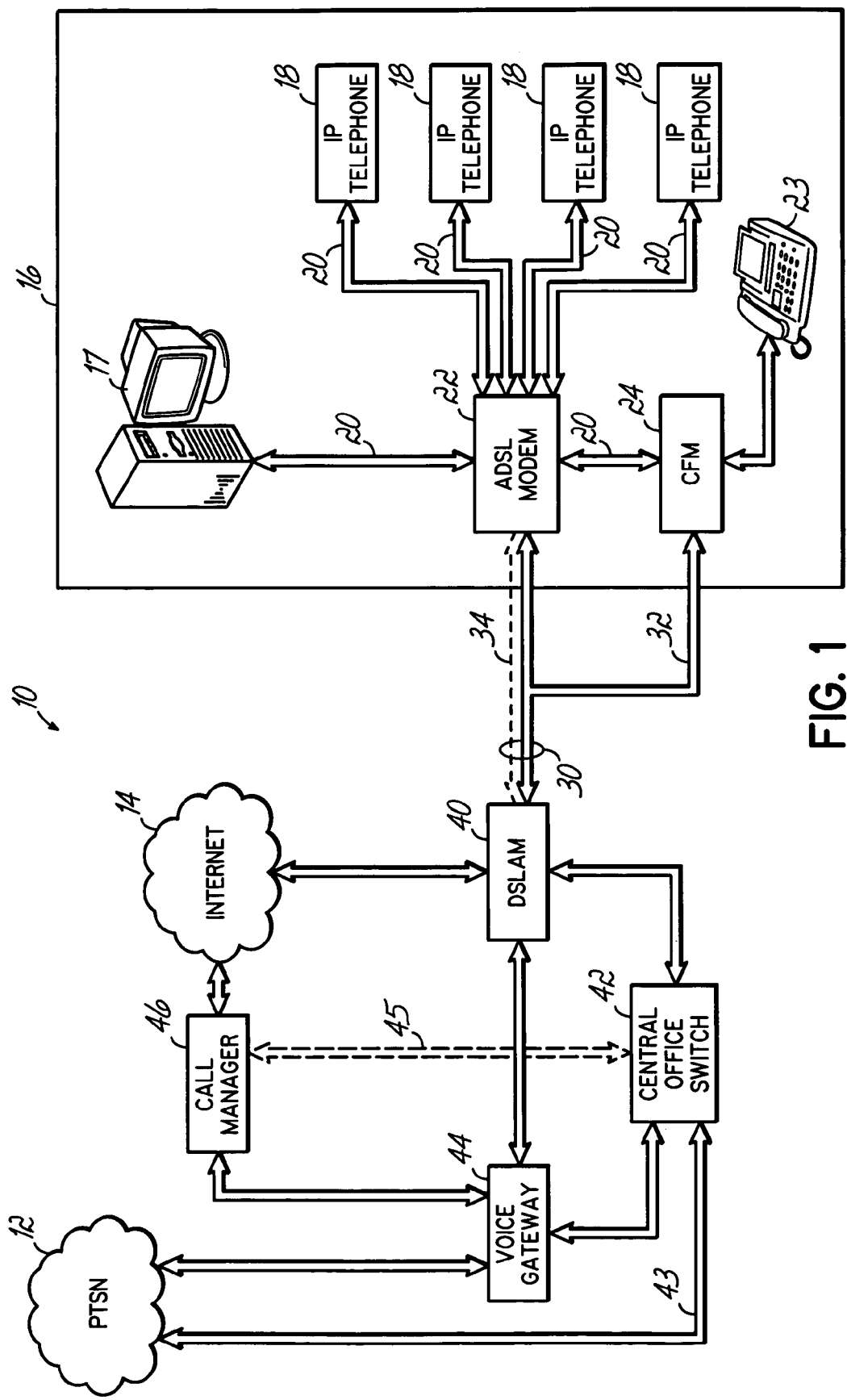
FIG. 1 is a telephone network architecture in accordance with principles of the present invention.

Referring now to FIG. 1, a telephone network architecture for combined VoIP, data, and analog POTS telephony in accordance with the principles of the present invention can be explained. In the combined system 10 illustrated in FIG. 1, the publicly switched telephone network 12 and Internet 14 are utilized for telephony originating from the premises 16 of a subscriber. As can be seen on FIG. 1, the subscriber's premises 16 includes computer systems 17 arranged for Internet telephony using, for example, "NetMeeting", as well as dedicated IP telephones 18. These IP telephones and computer systems interconnect for Internet telephony via a network connection such as an Ethernet connection 20 connected between each of the computer systems. Ethernet connections 20 may be routed through Ethernet switches or an Ethernet hub for use of a digital subscriber line (DSL) Internet connection. The switches or hub used for networking may be alone devices or alternatively may be incorporated within a digital subscriber line modem 22.

Subscriber premises 16 also includes a call forwarding manager 24 utilized in the manner described below to facilitate conversion between analog and Internet telephony. As will be elaborated below, call forwarding manager 24 is a proprietary hardware device for connection to a standard analog POTS telephone line such as line 32 illustrated in FIG. 1, and connection to an Internet connection such as via Ethernet connection 20 illustrated in FIG. 1. Call forwarding manager 24 receives incoming POTS telephone calls as a trigger to initiate VoIP telephony. CFM 24 may add value to this function by extracting from inbound calls dialed number information service (DNIS) data as well as automatic number identification (ANI) information. The purpose of call forwarding manager 24 is to identify calls, optionally collect DNIS and ANI information, and forward this data via the DSL or another Internet connection to a call manager so that analog calls may be appropriately terminated at a suitable voice gateway for subsequent connection to IP telephony equipment.

CFM 24 may also include additional value added features. For example, the CFM 24 may incorporate a DSL modem, eliminating the need for a separate modem. Other functions that might be incorporated include an Ethernet hub or switch, firewall or virtual private networking (VPN) functionality, quality of service (QOS) or RSVP services for local area networking, or other administrative functions. Furthermore, CFM 24 may be configured as a computer peripheral for a computer system such as 17 at the subscriber's premises, in which case the digital connections of the CFM 24 may be made via a Universal Serial Bus (USB), Firewire or other serial connection, or a IEEE-488 parallel port connection. CFM 24 could also be constructed as an expansion card for a computer system 17, in which case the digital connections of the CFM may be made via PCI, ISA or other internal bus connections.

Call forwarding manager 24 may include a POTS jack for connection to an analog telephone line and an analog telephone 23. This would permit POTS telephony to be used in unusual circumstances such as ADSL link failures. Alternatively, CFM 24 may be configured as a mixed capability IP/analog telephone, positioned and used as an IP telephone under ordinary circumstances but also available for POTS/analog telephony in emergency situations.

As a further alternative, CFM 24 may operate as a backup gateway for the IP telephones, usable in the event that the main Internet connection fails. In such a circumstance, the IP telephones may be configured, on timeout to the main connection, to connect to the CFM 24 so that the CFM 24 may provide backup gateway services by connection to the POTS telephone line. In this embodiment, the subscriber may have multiple POTS telephone lines, each coupled to the CFM 24, so that CFM 24 may provide multiple lines of service as a backup to IP telephony via the Internet connection.

CFM 24 may also provide connectivity to services other than IP telephony. For example, CFM 24 may provide an interactive voice response service, or connect to such a service, that can provide services such as Internet-routed X10 control of business or household appliances, via a voice response system. Other possibilities for voice response and/or Internet services may also be made available through CFM 24.

As seen on FIG. 1, the subscriber premises 16 utilizes only a DSL telephone connection for all telephony and Internet communications performed by the subscriber. As is known in the art, a digital subscriber line telephone connection utilizes frequency band multiplexing; analog POTS telephone data is carried at frequencies below 4.0 kHz and a digital data modulated at frequencies between 4.0 kHz and 1.1 MHz. Within the subscriber premises, analog telephone connections may be made to the DSL telephone line utilizing filters or diplexers (POTS splitters). Such equipment is used by CFM 24 to interact only with analog telephone signals on line 32. DSL modem 22 incorporates filtering circuitry to operate only with DSL telephone line 34 in the upper frequency band of 4.0 kHz to 1.1 MHZ, for data communications.

A DSL telephone connection 30 is supported by a DSL access multiplexor (DSLAM) 40 maintained by the local telephone carrier. DSLAM 40 is used by the telephone carrier to provide DSL connections to plural subscribers in a given geographic area. DSLAM 40 connects to the central office switch 42 maintained by the local telephone carrier which provides all analog/POTS telephone connection switching for all analog/POTS connections to subscribers through DSLAM 40. DSLAM 40 is further connected to the Internet 14 via a suitable network connection, such as a router maintained by the local telephone carrier or an affiliated Internet access provider.

DSL access is provided by telephone carriers on the assumption that all telephony traffic will continue to be routed on analog/POTS service through DSLAM 40 to central office switch 42, and from there to the publicly switched telephone network 12 via connection 43. In accordance with the principles of the present invention, a subscriber may utilize Internet IP telephony in all cases via an independent service provider and thereby discontinue use of direct analog/POTS telephony via the local carrier central office switch 42, except perhaps in emergency conditions. This permits the subscriber to access lower cost of service IP telephony without any resulting loss of convenience to the subscriber.

To facilitate this goal, an independent service provider provides a voice gateway 44 and call manager 46 which are shared by plural subscribers connected via DSL service to local telephone carrier(s). Voice gateway 44 which in one embodiment of the invention is a CISCO VG200 available Cisco Systems, Inc., is connected to the publicly switched telephone network 12 via a time division multiplexing (TDM) or foreign exchange office (FXO) connection, and connected to the local telephone central office switch 42 via a similar TDM or FXO connection. Voice gateway 44 is also connected to DSLAM 40 via an Ethernet connection directly or indirectly leading to a router to permit the exchange of digitized voice packets between voice gateway 44 and DSLAM 40.

A call manager 46 is also interconnected to voice gateway 44, via an Ethernet connection directly or indirectly leading to a router permitting call manager 46 to control operations of voice gateway 44 using media gateway control protocol (MGCP) commands as described in further detail below. Optionally, call manager 46 may be connected to central office switch 42 using a telephony application programming interface (TAPI) connection 45 that may be provided by the telephone carrier. Call manager 46 is further connected to an Internet connection 14 such an Ethernet connection directly or indirectly leading to a router, to permit call manager to receive Internet protocol requests and responses from call forwarding manager 24, IP telephones 18 and remote call manager 46. Call manager 46, in one embodiment of the present invention is a CISCO MCS 783x, also available from CISCO Systems, Inc.

The TDM or FXO connections available to voice gateway 44 permit voice gateway 44 to terminate incoming analog/POTS telephone calls and convert those calls for use by IP telephones 18. Furthermore, calls originated by IP telephones 18 that are to be delivered to analog/POTS recipients may be converted by voice gateway 44 for delivery via TDM to the publicly switched telephone network 12 or the central office switch 42. In a wide area implementation of the present invention, a plurality of call manager 46/voice gateway 44 pairs will be positioned at a variety of local telephone calling areas. The voice gateway/call manager pairs may be grouped at one or more central telephone facilities, networked to the local telephone facilities, and/or may be located at the facility of an Internet service provider and may be interconnected via Internet networking or via intranets (which may be proprietary or may be leased from communications carriers).

Figure 2A:
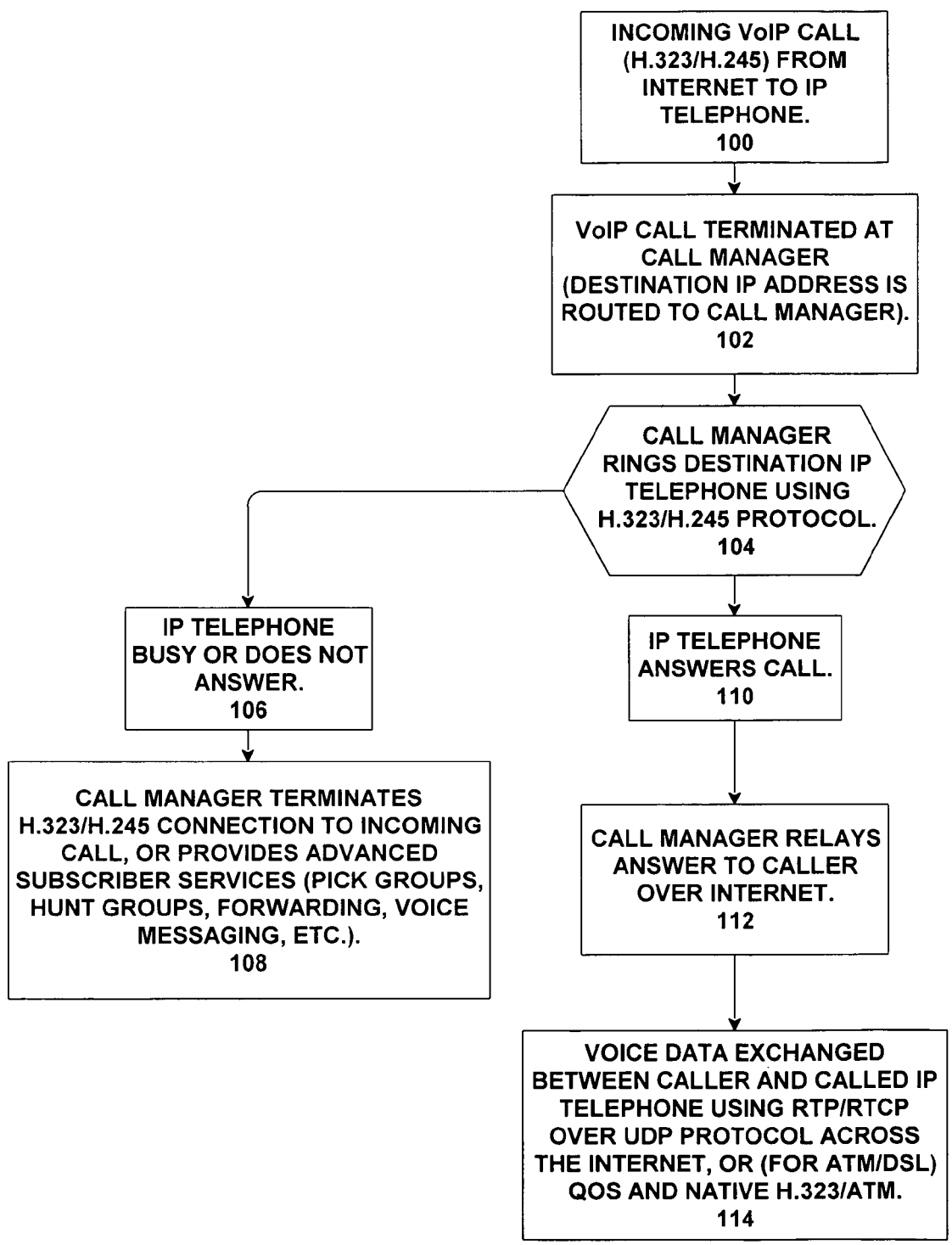
FIG. 2A is a flow chart illustrating operations of the above described equipment in terminating an incoming voice over VoIP call from an Internet connection.

Referring now to FIG. 2A, operations of the above described equipment in terminating an incoming voice over VoIP call from an Internet connection can be explained. In step 100, the incoming VoIP telephone call is received using the H.323 protocol standard. Step 102, the VoIP is terminated at the call manager 46. This will occur because the destination IP address for any IP telephone owned by a subscriber will be directed to the IP address of the call manager 46, in all name services to which the subscriber identified. Upon receiving the call in step 102, in step 104 the call manager 46 will utilized internal tables to identify the subscriber premises 16, and the IP address of the desired destination IP telephone at the subscriber premises 16. The call manager 46 will then ring the destination IP telephone utilizing the H.323 protocol standard. Note that a subscriber 16 may have multiple IP telephones each assigned its own IP address. The use of multiple telephones may be facilitated by call manager 46 simply by providing separate IP addresses for each desired IP telephone in the routing tables at call manager 46.

When call manager 46 rings the desired IP telephone, it will either be busy, answer, or not answer. If busy or no answer occurs in step 106, then in step 108 the call manager 46 may terminate the H.323 connection to the incoming call thus ending the IP telephone exchange. Alternatively, call manager 46 can provide additional services beyond simply routing of telephone connections to IP telephones. For example, IP telephone calls received from call manager 46 may be routed to voice messaging in a no answer or busy condition, or may be forwarded to an identified IP or analog/POTS telephone in such conditions, for example to a monitoring extension at the subscriber premises 16. Furthermore, call manager 46 may manage a hunt group or pick group of IP telephones in the manner analogous to that provided by local telephone carriers for analog/POTS telephone subscribers. All of these functions can be readily facilitated by call manager 46 because all VoIP traffic is delivered to call manager 46, which may access destination IP address and provide subscribed services of any variety that may be desired by a subscriber. Additionally, the call manager 46 may provide some form of audible and/or visible prompting at the recipients' IP telephone or computer station and allow the recipient to pick up the incoming call (this may form, e.g., a call waiting service). If the IP telephone at the subscriber premises 16 answers the call (step 110), then the call manager 46 will relay the IP address of the answering IP telephone to the calling IP telephone via the Internet connection in step 112. At this point, the calling IP telephone and called IP telephone have exchanged IP addresses terminal capabilities, and creation of media channels and may begin Internet telephony. At this point, voice data is exchanged between the caller and the called IP telephone using the RTP/RTCP over UDP protocols across the Internet. Alternatively, for asynchronous transfer mode (ATM) digital subscriber line connections, voice data may also be exchanged using quality of service (QOS) exchange to the H.323/ATM standard.

Figure 2B:
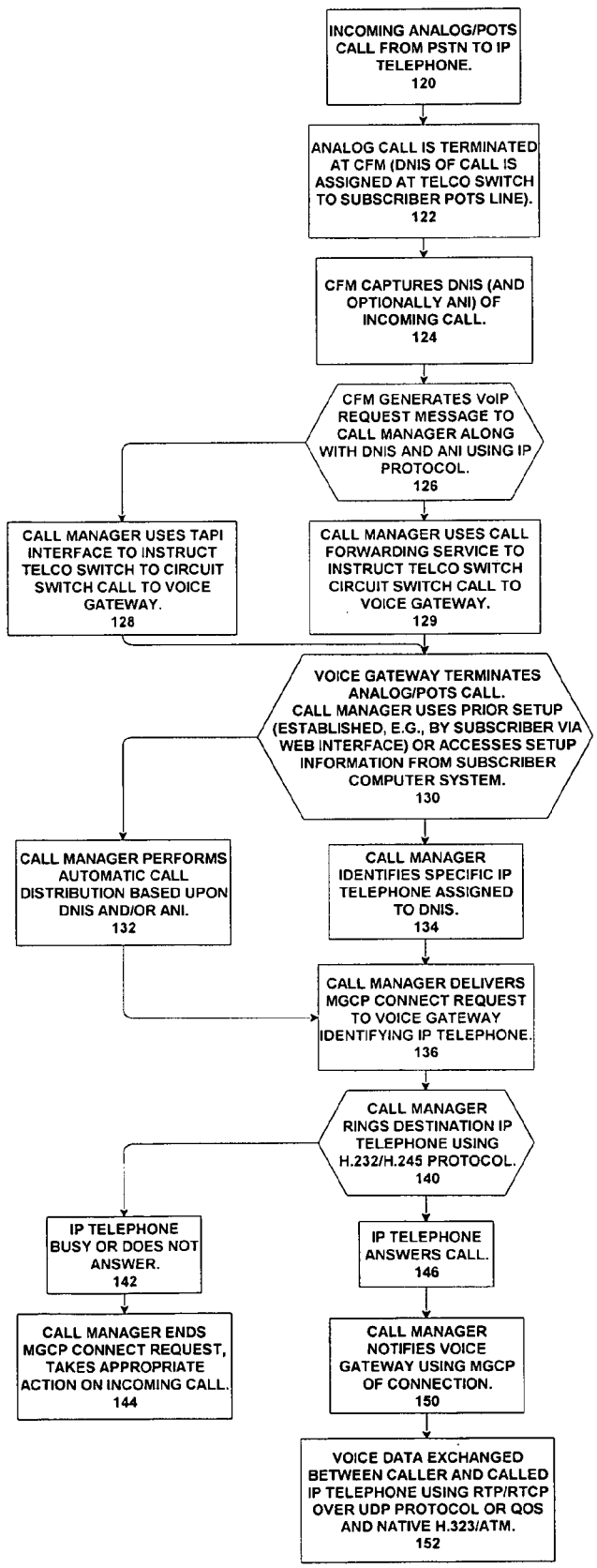
FIG. 2B is a flow chart illustrating the process for handling an incoming analog/POTS telephone call from the publicly switched telephone network directed to an IP telephone.

Referring now to FIG. 2B, the process for handling an incoming analog/POTS telephone call from the publicly switched telephone network directed to an IP telephone, can be explained. As an initial point, it should be noted that the subscriber obtains from the local telephone service one or a number of telephone numbers. The local telephone carrier therefore will forward calls directed to these numbers from the analog/POTS telephone network to the subscriber's analog telephone line 32. These calls will then delivered to any analog telephone connected at the subscriber premises 16, and most particularly to the call forwarding manager 24 noted above. Incoming analog calls are delivered with DNIS information identifying the assigned telephone number to which the call is directed as well as optionally ANI information identifying the calling party.

In step 122, when an analog call is delivered to POTS line 32 at the subscribers premises 16, the call forwarding manager 24 picks up the line and terminates the call at the CFM 24. In step 124, CFM 24 captures the dialed number information service (DNIS) data and optionally also the automatic number identification (ANI) data for the incoming call, for later use in routing the call to one of the computer 17 of IP telephones 18 at the subscriber's premises 16. To facilitate such routing, the call forwarding manager 24 generates a VoIP request message to be delivered via its Internet connection on line 20 (via the DSL connection and other Internet and IP connections) to call manager 46. The message delivered by CFM 24 to call manager 46 includes the DNIS and ANI information received from the call terminated on line 32 (step 126).

At this point, the call manager 46 is aware that a call has been made from the analog/POTS telephone network to the subscriber's premises 16. In the following steps, the call manager 46 routes this call via voice gateway 44 for delivery to the one of the IP telephones 18 or a subscriber computer 17. Many possible methodologies may be used for such routing. In one possible implementation, the entity providing the call management service may arrange with the local telephone carrier, to obtain a telephony application programming interface (TAPI) connection 45 directly or indirectly leading to a router to the local telephone company central office switch, which permits direct control of the switch by the call manager 46. In this implementation, in step 128, the call manager 46 may use the TAPI interface 45 to instruct the local telephone company switch 42 to circuit switch the call received by the analog/POTS telephone line connected to the CFM 24, to the voice gateway 44.

An alternative implementation does not require the use of TAPI interface 45 to the telephone company central office switch 42. In this alternative implementation, the call manager 46 uses a call forwarding service of the local telephone company to instruct the local telephone company switch circuit switch the call received by the analog/POTS telephone line connected to the CFM 24, to an analog/POTS telephone number corresponding to the voice gateway 44 (step 129).

In either implementation described above, the call being received by the CFM 24 is circuit switched to the voice gateway 44, where the call is terminated as an analog/POTS call. In the subsequent step 130, the call manager 46 utilizes previously determined setup information to determining how to handle the incoming call. For example, in step 134 the call manager 46 may identify a specific IP telephone 18 to which the call should be rerouted based upon the DNIS of the call. Alternatively, in step 132 the call manager 46 may perform automatic call distribution, or manage a hunt group, based upon the DNIS or ANI of the call received at the CFM 24 to identify a specific IP telephone 18 to which the call should be rerouted. It will be appreciated that a wide variety of subscriber services may be controlled by call manager 46 based upon subscriber preferences and that these preferences may be selected by subscriber on a fee for service basis.

A subscriber may establish preferences via Internet interfaces, e.g. web browser interface, to call manager 46. Alternatively, call management parameters may be established at a computer system 17 at the subscriber premises 16, in which case the call manager 46 may access these preferences from the computer system 17 prior to instructing the voice gateway 44 as to proper termination of the incoming call. Alternatively, the call manager may direct the incoming call to an automated directory service with store and forward voice prompting to select an appropriate IP destination for the call.

In any of the above described cases, after determining appropriate handling of the incoming call, in step 136 the call manager 46 delivers a media gateway control protocol (MGCP) connection request to the voice gateway 44, to terminate a call from the local telephone company central office switch 42. In step 140, the call manager 46 then "rings" the destination IP telephone 18 using the H.323 protocol standard. At this point, the IP telephone will either answer, not answer or be busy. These cases are handled separately by call manager 46 as appropriate for the subscriber preferences.

If the destination IP telephone is busy or does not answer in step 142, then the call manager 46 ends the MGCP connect request to the voice gateway 44 and then takes appropriate action on the incoming call in step 144. As noted above, this may include routing to alternative IP telephones using hunt or pick groups, providing voice messaging, call forwarding or other added value services according to subscriber preferences and programming.

Alternatively, if the IP telephone answers the call in step 146, the call manager 46 will notify the voice gateway 44 that the call has been answered using the MGCP protocol in step 150 and then in step 152, digitized voice packets will be exchanged between the caller and the call IP telephone via the voice gateway 44 using RTP/RTCP over UDP protocols, or QOS and Native H.323/ATM, as described above.

Figure 2C:
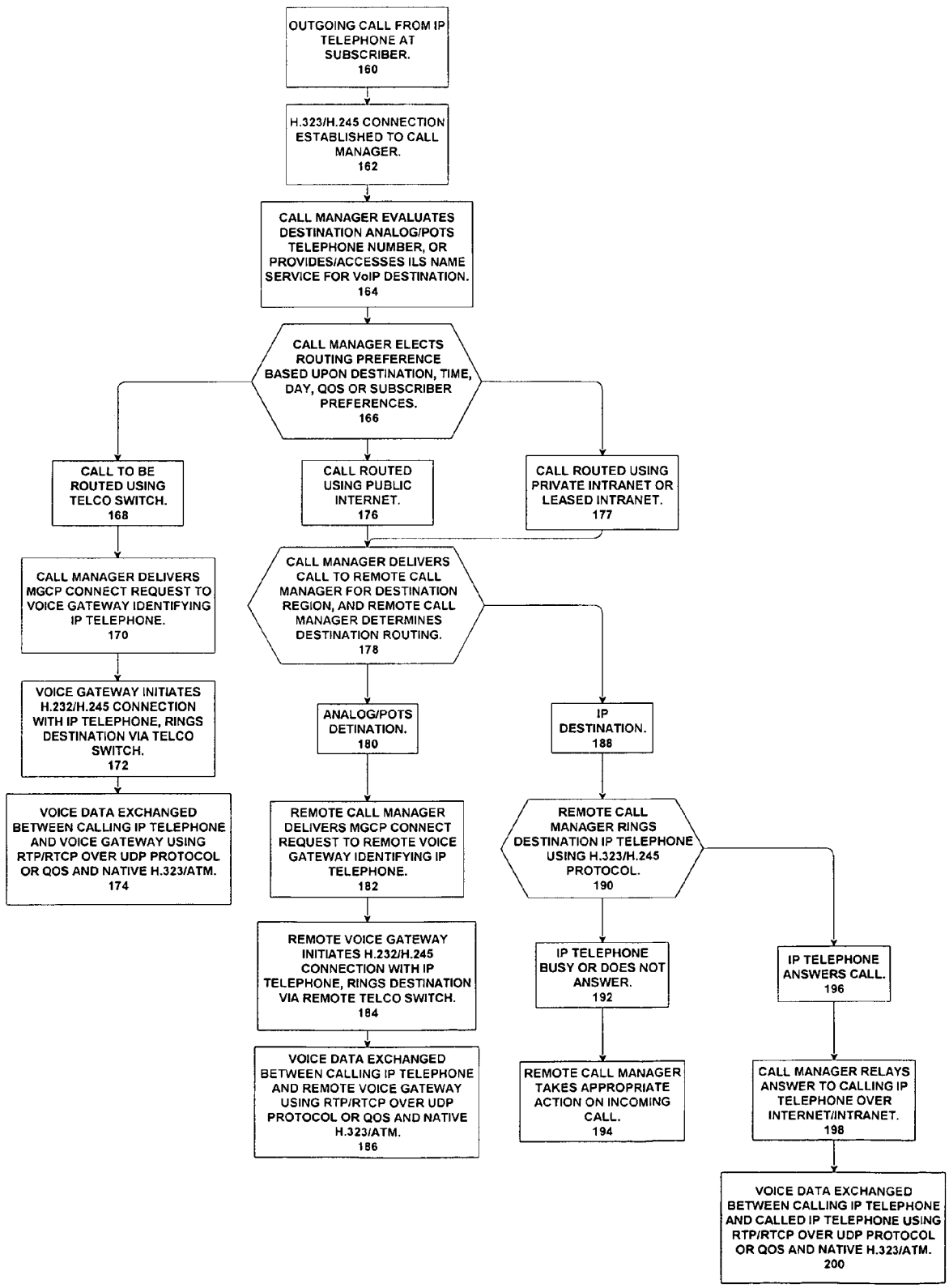
FIG. 2C is a flow chart illustrating the process for generating outgoing calls.

Referring now to FIG. 2C, the process for generating outgoing calls can be described. In step 160, an outgoing call is generated from one of the IP telephones 18 at the subscribers premises 16. This involves establishing, in step 162, an H.323 connection to call manager 46. In step 164, the call manager 46 then evaluates the destination, which may be an analog/POTS telephone number, or an Internet destination for an IP telephone. In the case of an Internet destination, the call manager 46 may provide or access ILS name services of VoIP destinations, to identify a specific Internet address for the destination IP telephone. Then, in step 166, the call manager 46 utilizes information about the destination to elect a routing preference, which may be based upon the destination's geographic location, the time, the day, quality of service parameters or subscriber preferences.

A first option that can be utilized by the call manager 46 is to route telephone calls via the telephone company central office switch 42 in step 168. In this situation, the call manager 46 will deliver in step 170 at MGCP connection request to the voice gateway 44 identifying the IP telephone originating the call. Then in step 172, the voice gateway 44 will initiate an H.323 connection with the IP telephone 18. At the same time, the voice gateway 44 will ring the destination telephone using standard analog/POTS telephony via the telephone company switch 42. Thereafter, voice data will be exchanged between the calling IP telephone 18 and voice gateway 44 using an IP protocol, such as RTP/RTCP over UDP or QOS and Native H.323/ATM. This voice data will then be converted to analog data for delivery to the central office switch 42 which relays that data to the via the public telephone network to the destination telephone.

The call manager 46 may also elect to route calls using Internet or intranet routing. In step 176, the call may be routed using the public Internet, for example where the subscriber preferences or quality of service or available facilities do not permit intranet routing. Intranet routing in step 177 may be used whenever it is available and has been elected.

A third alternative for the call manager would be to route the call to a circuit switched long distance carrier from the voice gateway using MGCP commands from the call manager and SS7 signaling with the circuit switched long distance carriers' equipment.

In each case, in step 178 the call manager 46 will deliver information about the call to a remote call manager for the destination region. The remote call manager will then determine destination routing in step 178 so that the call may be delivered to the appropriate destination. If the appropriate destination is an analog/POTS telephone in step 180, then the remote call manager will deliver an MGCP connection request to a remote voice gateway identifying the telephone originating the call and the destination telephone number. In step 182, the remote call manager will then initiate an H.323 connection with the IP telephone and also ring the destination telephone via a remote telephone company switch. Then in step 186, voice data will be exchanged between the calling IP telephone and the remote voice gateway with the protocols mentioned earlier in step 174 and that voice data will be converted to analog/POTS data delivered through the remote central office switch to the remote telephone number.

Where the remote telephone number being called is an IP telephone, then an IP destination is identified by the call manager. In this case, in step 190, the remote call manager will ring destination IP telephone using H.323 protocol standard. If the remote IP telephone is busy or does not answer in step 192, then in step 194, the remote call manager will take appropriate action on the incoming call which may simply involve terminating the connection, or if the remote IP telephone is a subscriber to enhanced services provided by the call manager, then the remote call manager may provide enhanced services as described above such as pick groups, hunt groups, voice messaging, call forwarding and the like.

If the remote IP telephone answers the call in step 196, then the call manager will relay the answer to calling IP telephone via the Internet or intranet connection that has been previously established. Then in step 200, voice data will be exchanged directly between the calling telephone and the called telephone using the IP telephony protocols described above.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of providing Internet telephony to a subscriber premises via a subscriber Internet connection to said subscriber premises, using an analog telephone connection, comprising
   providing a voice gateway converting Internet telephony and analog telephony standards to facilitate the use of Internet and analog telephony by said subscriber,
   providing a call forwarding manager connected to said analog telephone connection,
   providing an Internet protocol telephone at said subscriber premises,
   receiving an analog telephone call from said analog telephone connection at said call forwarding manager, and responding to said reception by generating a request for service from said voice gateway,
   generating an Internet telephone connection from said voice gateway to said Internet protocol telephone at said subscriber premises in response to said request for service from said call forwarding manager, and
   connecting said analog telephone call via said voice gateway to said Internet protocol telephone via said subscriber Internet connection.

2. The method of claim 1 wherein said call forwarding manager is located at said subscriber premises and said analog telephone line connects to said subscriber premises.

3. The method of claim 1 wherein said voice gateway is remote from said subscriber premises.

4. The method of claim 3 wherein said voice gateway is utilized by multiple subscribers simultaneously to provide conversion between Internet telephony and analog telephony standards.

5. The method of claim 1 further comprising providing a call manager, said call manager receiving said request for service from said call forwarding manager, said call manager establishing the Internet telephone connection from said voice gateway to said Internet protocol telephone for use by said voice gateway.

6. The method of claim 5 wherein said call manager performs a data driven call management application.

7. The method of claim 1 wherein said call manager provides enhanced services to said subscriber selected from the group comprising: establishing pick groups, hunt groups, call forwarding and voice messaging for Internet protocol telephone of said subscriber.

8. The method of claim 1 wherein said call forwarding manager receives dialed number information service data regarding said analog telephone call and forwards said dialed number information service data as part of said request for service.

9. The method of claim 8 wherein said dialed number information service data is used in identifying said Internet protocol telephone as a recipient of said analog telephone call.

10. The method of claim 9 wherein said call forwarding manager receives automatic number identification data regarding said analog telephone call and forwards said automatic number identification data as part of said request for service.

11. The method of claim 10 wherein said automatic number identification data is used in identifying said Internet protocol telephone as a recipient of said analog telephone call.

12. The method of claim 1 wherein said analog telephone call is connected to said voice gateway by delivery of one or more of TAPI, JTAPI, SCTP, or proprietary interface commands to a telecommunications exchange switch.

13. A system for providing Internet telephony to a subscriber premises via a subscriber Internet connection to said subscriber premises, using an analog telephone connection, comprising
   a voice gateway converting Internet telephony and analog telephony standards to facilitate the use of Internet and analog telephony by said subscriber,
   a call forwarding manager connected to said analog telephone connection,
   said call forwarding manager receiving an analog telephone call from an analog telephone line, and responding to said reception by generating a request for service from said voice gateway,
   said voice gateway generating an Internet telephone connection to an Internet protocol telephone at said subscriber premises in response to said request for service from said call forwarding manager, and connecting said analog telephone call via said voice gateway to said Internet protocol telephone via said subscriber Internet connection.

14. The system of claim 13 wherein said call forwarding manager is located at said subscriber premises and said analog telephone line connects to said subscriber premises.

15. The system of claim 13 wherein said voice gateway is remote from said subscriber premises.

16. The system of claim 15 wherein said voice gateway is coupled to Internet protocol telephones located at the premises of multiple subscribers, to provide conversion between Internet telephony and analog telephony standards.

17. The system of claim 13 further comprising a call manager, said call manager receiving said request for service from said call forwarding manager, said call manager establishing the Internet telephone connection from said voice gateway to said Internet protocol telephone for use by said voice gateway.

18. The system of claim 17 wherein said call manager performs a data driven call management application.

19. The system of claim 13 wherein said call manager provides enhanced services to said subscriber including one or more of establishing pick groups, hunt groups, call forwarding, voice driven local directory service and voice messaging for Internet protocol telephone of said subscriber.

20. The system of claim 13 wherein said call forwarding manager receives dialed number information service data regarding said analog telephone call and forwards said dialed number information service data as part of said request for service.

21. The system of claim 20 wherein said dialed number information service data is used in identifying said Internet protocol telephone as a recipient of said analog telephone call.

22. The system of claim 21 wherein said call forwarding manager receives automatic number identification data regarding said analog telephone call and forwards said automatic number identification data as part of said request for service.

23. The system of claim 22 wherein said automatic number identification data is used in identifying said Internet protocol telephone as a recipient of said analog telephone call.

24. The system of claim 13 wherein said analog telephone call is connected to said voice gateway by delivery of one or more of TAPI, JTAPI, SCTP, or proprietary interface commands to a telecommunications exchange switch.

25. A call forwarding manger for use in interfacing Internet telephony to a subscriber premises using an analog telephone line, comprising
an analog telephone connection for connection to said analog telephone line to capture data selected from the group comprising dialed number information service data and automatic number identification data, and
a digital communications connection for delivering a request for service with data selected from the group comprising said dialed number information service data and said automatic number identification data.

26. The call forwarding manager of claim 25 wherein said digital communications connection comprises a serial connection.

27. The call forwarding manager of claim 26 wherein said serial connection comprises one or more of USB, Firewire and Ethernet.

28. The call forwarding manager of claim 25 wherein said digital communications connection comprises a parallel connection.

29. The call forwarding manager of claim 28 wherein said parallel connection comprises one or more of PCI, ISA and IEEE-488.

30. The call forwarding manager of claim 25 wherein said request for service is delivered as an IP packet.

31. The call forwarding manager of claim 25 further comprising firewall and VPN systems for managing communications via said digital communications connection.

32. The call forwarding manager of claim 25 further comprising an ADSL, cable, or wireless modem.

33. The call forwarding manager of claim 25 further comprising quality of service and RSVP service systems for managing communications via said digital communications connection.

* * * * *